(12) United States Patent
Mennecke et al.

(10) Patent No.: US 9,708,517 B2
(45) Date of Patent: Jul. 18, 2017

(54) PRIMERLESS ADHESION OF ADHESIVES AND SEALANTS BASED ON SILANE-FUNCTIONAL POLYMERS

(71) Applicant: SIKA TECHNOLOGY AG, Baar (CH)

(72) Inventors: Klaas Mennecke, Lottstetten (DE); Sara Fedier, Dietlikon (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/779,525

(22) PCT Filed: Apr. 9, 2014

(86) PCT No.: PCT/EP2014/057170
§ 371 (c)(1),
(2) Date: Sep. 23, 2015

(87) PCT Pub. No.: WO2014/167007
PCT Pub. Date: Oct. 16, 2014

(65) Prior Publication Data
US 2016/0046847 A1 Feb. 18, 2016

(30) Foreign Application Priority Data

Apr. 10, 2013 (EP) .................................... 13163116

(51) Int. Cl.
| | | |
|---|---|---|
| *C09J 175/08* | (2006.01) | |
| *C08G 18/48* | (2006.01) | |
| *C08G 18/75* | (2006.01) | |
| *C08K 5/00* | (2006.01) | |
| *C08G 18/10* | (2006.01) | |
| *C08K 5/205* | (2006.01) | |
| *C08K 5/3465* | (2006.01) | |
| *C08K 5/548* | (2006.01) | |
| *C08G 18/34* | (2006.01) | |
| *C09D 175/08* | (2006.01) | |

(52) U.S. Cl.
CPC ............ *C09J 175/08* (2013.01); *C08G 18/10* (2013.01); *C08G 18/341* (2013.01); *C08G 18/4825* (2013.01); *C08G 18/755* (2013.01); *C08K 5/0016* (2013.01); *C08K 5/205* (2013.01); *C08K 5/3465* (2013.01); *C08K 5/548* (2013.01); *C09D 175/08* (2013.01)

(58) Field of Classification Search
CPC .............................. C08L 101/10; C08K 5/548
See application file for complete search history.

(56) References Cited

U.S. PATENT DOCUMENTS

| | | | |
|---|---|---|---|
| 2005/0126683 A1 | 6/2005 | Hsieh et al. | |
| 2009/0226740 A1 | 9/2009 | Teysseire | |
| 2010/0105798 A1* | 4/2010 | Hasegawa ............. | C08F 299/00 522/99 |
| 2011/0028640 A1 | 2/2011 | Klein et al. | |
| 2014/0179830 A1* | 6/2014 | Burckhardt ........... | C08L 101/00 523/425 |

FOREIGN PATENT DOCUMENTS

| | | |
|---|---|---|
| CN | 101525484 A | 9/2009 |
| CN | 102086368 A | 6/2011 |
| DE | 10 2008 021221 A1 | 10/2009 |
| EP | 2 098 548 A1 | 9/2009 |
| EP | 2 562 223 A2 | 2/2013 |

OTHER PUBLICATIONS

International Preliminary Report on Patentability and Written Opinion of the International Searching Authority (Forms PCT/IB373 and PCT/ISA/237) issued on Oct. 22, 2015, by the International Bureau of WIPO, in corresponding International Application No. PCT/EP2014/057170. (10 pages).
International Search Report (PCT/ISA/210) mailed on Jul. 7, 2014, by the European Patent Office as the International Searching Authority for International Application No. PCT/EP2014/057170.
Written Opinion (PCT/ISA/237) mailed on Jul. 7, 2014, by the European Patent Office as the International Searching Authority for International Application No. PCT/EP2014/057170.
Apr. 1, 2017 Chinese Office Action issued by SIPO in Chinese Application No. 201480019911.7.

\* cited by examiner

*Primary Examiner* — Kuo-Liang Peng
(74) *Attorney, Agent, or Firm* — Buchanan Ingersoll & Rooney PC

(57) ABSTRACT

The present invention relates to a composition having at least one silane-functional polymer P; and at least one catalyst for the crosslinking of silane-functional polymers, selected from among an organotitanate, an organozirconate and an organoaluminate. The composition includes at least one base; and at least one ethoxy mercaptosilane. Compositions of this type are suitable for use as adhesives, sealants or coatings, such as for plastics, including PVC.

22 Claims, No Drawings

PRIMERLESS ADHESION OF ADHESIVES AND SEALANTS BASED ON SILANE-FUNCTIONAL POLYMERS

TECHNICAL FIELD

The present invention relates to the field of flexible adhesives and sealants and to coatings that are based on silane-functional polymers.

PRIOR ART

Compositions based on silane-functional polymers and the use of said compositions as adhesives, sealants or coatings are well-known and have been described multiple times. Likewise known is the use of mercaptosilanes in compositions of this type for the purpose of improving the adhesion thereof to various substrates, whereby the adhesion, sealing or coating of said substrates is possible without first applying a primer.

For instance, EP2098548B1 describes a composition comprising a composition based on a silane-functional polymer, which comprises 3-mercaptopropyltrimethoxysilane and an organotitanate, and therefore exhibits superior adhesion to porous substrates. However, the composition described in EP2098548B1 has some potential for improvement in terms of its adhesion to certain substrates, in particular to plastics such as PVC.

BRIEF SUMMARY OF THE INVENTION

The object of the present invention is therefore to provide a composition based on silane-functional polymers which exhibits improved adhesion, in particular to plastics, preferably to PVC, with primerless application.

Unexpectedly, it has now been found that this object is attained by the composition according to claim 1.

By combining an ethoxy mercaptosilane with a specific catalyst and a base in a composition based on a silane-functional polymer, the adhesion of such a composition, in particular to plastics and to a certain extent to PVC, can be improved.

Further aspects of the invention are the subject matter of additional independent claims. Particularly preferred embodiments of the invention are the subject matter of the dependent claims.

DETAILED DESCRIPTION OF THE INVENTION

The subject matter of the present invention is a composition comprising
at least one silane-functional polymer P;
at least one catalyst for crosslinking silane-functional polymers, selected from the group consisting of an organotitanate, an organozirconate and an organoaluminate;
at least one base; and
at least one ethoxy mercaptosilane.

In the present document, substance names that begin with "poly", such as polyol or polyisocyanate, refer to substances that formally contain two or more of the functional groups present in the name thereof per molecule.

In the present document, the term "polymer" covers a collective of macromolecules which are chemically homogeneous but are different in terms of degree of polymerization, molar mass and chain length, and which have been produced by means of a polyreaction (polymerization, polyaddition, polycondensation). The term also covers derivatives of such a collective of macromolecules from polyreactions, in other words compounds that have been obtained by conversion reactions, for example additions or substitutions, of functional groups on specified macromolecules, and which can be chemically homogeneous or chemically inhomogeneous. The term further comprises so-called prepolymers, in other words, reactive oligomeric pre-adducts, the functional groups of which are involved in the creation of macromolecules. The term "polyurethane polymer" covers all polymers that are produced according to the so-called diisocyanate polyaddition method. This includes polymers that are nearly or entirely free of urethane groups. Examples of polyurethane polymers include polyether polyurethanes, polyester polyurethanes, polyether polyureas, polyureas, polyester polyureas, polyisocyanurates and polycarbodiimides.

In the present document, the terms "silane" and "organosilane" refer to compounds that have at least one, usually two or three, alkoxy groups or acyloxy groups that are bonded directly to the silicon atom via Si—O bonds, and that have at least one organic residue that is bonded directly to the silicon atom via an Si—C bond. Silanes of this type are also known to a person skilled in the art as organoalkoxysilanes or organoacyloxysilanes. Therefore, according to this definition, "tetraalkoxysilanes" are not considered organosilanes. Accordingly, the term "silane group" refers to the silicon-containing group that is bonded to the organic residue of the silane via the Si—C bond. The silanes, or the silane groups thereof, have the property of hydrolyzing upon coming into contact with moisture. In this process, organosilanols are formed, that is, silicon-organic compounds containing one or more silanol groups (Si—OH groups) and, by subsequent condensation reactions, organosiloxanes, that is, silicon organic compounds containing one or more siloxane groups (Si—O—Si groups).

The term "silane-functional" refers to compounds that have silane groups. "Silane-functional polymers" are therefore polymers that have at least one silane group.

"Aminosilanes" or "mercaptosilanes" are organosilanes, the organic residue of which has an amino group or a mercapto group, respectively. In the present document, the terms "organotitanate", "organozirconate" and "organoaluminate" refer to compounds that have at least one ligand bonded to the titanium, zirconium or aluminum atom via an oxygen atom.

In the present document, a "polydentate ligand" or "chelating ligand" is understood as a ligand which has at least two free electron pairs and can occupy at least two coordination sites on the central atom. A bidentate ligand is correspondingly capable of occupying two coordination sites on a central atom.

In the present document, the term "primer" refers to a thin layer, typically thinner than 1 mm, in particular between 1 and 200 µm, preferably between 1 and 100 µm, of an adhesion promoter composition, which is applied as a underlayer coating to the surface of a substrate, and which leads to an improvement in the adhesion of the composition to the substrate. Accordingly, the term "primerless" refers to the bonding, sealing or coating of substrates without pretreating said substrates with a primer.

In the present document, the "molecular weight" is always understood as the molecular weight average $M_n$ (numerical average).

The composition according to the invention contains at least one silane-functional polymer P, which particularly has terminal groups of formula (I).

In this formula, residue $R^1$ denotes an alkyl group having 1 to 8 C atoms, in particular a methyl group or an ethyl group.

Residue $R^2$ denotes an acyl group or alkyl group having 1 to 5 C atoms, in particular a methyl group or an ethyl group or an isopropyl group. Most preferably, $R^2$ denotes an ethyl group.

Residue $R^3$ denotes a linear or branched, optionally cyclic alkylene group having 1 to 12 C atoms, optionally having aromatic fractions, and optionally having one or more heteroatoms, in particular having one or more nitrogen atoms.

Index a denotes a value of 0 or 1 or 2, in particular a value of 0.

In a silane group of formula (I), $R^1$ and $R^2$ each independently denote the described residues. Thus compounds of formula (I) which represent ethoxy-dimethoxy alkylsilanes ($R^2$=methyl, $R^2$=methyl, $R^2$=ethyl) are possible, for example.

In a first embodiment, the silane-functional polymer P is a silane-functional polyurethane polymer P1, which can be obtained by reacting a silane which has at least one group that is reactive to isocyanate groups with a polyurethane polymer which has isocyanate groups. This reaction is preferably run in a 1:1 stoichiometric ratio of groups that are reactive to isocyanate groups to isocyanate groups, or with a slight surplus of groups that are reactive to isocyanate groups, so that the resulting silane-functional polyurethane polymer P1 is entirely free of isocyanate groups.

The silane which has at least one group that is reactive to isocyanate groups is a mercaptosilane, an aminosilane, or a hydroxysilane, for example, in particular an aminosilane.

The aminosilane is preferably an aminosilane AS of formula (Ia),

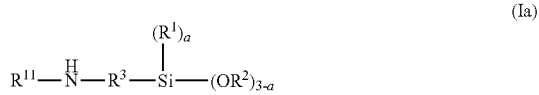

in which $R^1$, $R^2$, $R^3$ and a are as described above, and $R^{11}$ denotes a hydrogen atom or a linear or branched hydrocarbon residue having 1 to 20 C atoms, optionally with cyclic fractions, or denotes a residue of formula (II).

In this formula, residues $R^{12}$ and $R^{13}$, independently of one another, denote a hydrogen atom or a residue from the group comprising —$R^{15}$, —CN and —COOR$^{15}$.

Residue $R^{14}$ denotes a hydrogen atom or a residue from the group comprising —$CH_2$—COOR$^{15}$, —COOR$^{15}$, CONHR$^{15}$, —CON(R$^{15}$)$_2$, —CN, —NO$_2$, —PO(OR$^{15}$)$_2$, —SO$_2$R$^{15}$ and —SO$_2$OR$^{15}$.

Residue $R^{15}$ denotes a hydrocarbon residue, optionally containing at least one heteroatom, having 1 to 20 C atoms.

Examples of suitable aminosilanes AS include primary aminosilanes such as 3-aminopropyltriethoxysilane, 3-aminopropyldiethoxymethylsilane; secondary aminosilanes such as N-butyl-3-aminopropyltriethoxysilane, N-phenyl-3-aminopropyltriethoxysilane; the products of the Michael-type addition of primary aminosilanes such as 3-aminopropyltriethoxysilane or 3-aminopropyldiethoxymethylsilane to Michael acceptors such as acrylonitrile, (meth)acrylic acid esters, (meth)acrylic acid amides, maleic acid diesters and fumaric acid diesters, citraconic acid diesters and itaconic acid diesters, for example N-(3-triethoxysilyl-propyl)-amino-succinic acid dimethyl ester and diethyl ester; and analogues of said aminosilanes with methoxy groups or isopropoxy groups in place of the preferred ethoxy groups on the silicon. Particularly suitable aminosilanes AS are secondary aminosilanes, in particular aminosilanes AS in which $R^4$ in formula (III) is not H. Michael-type adducts are preferred, in particular N-(3-triethoxysilyl-propyl)-amino-succinic acid diethyl ester.

In the present document, the term "Michael acceptor" refers to compounds which are capable, due to the double bonds contained therein and activated by electron-acceptor residues, of entering into nucleophilic addition reactions with primary amino groups (NH$_2$ groups) in a manner similar to Michael addition (hetero-Michael addition).

Suitable polyurethane polymers that have isocyanate groups for producing a silane-functional polyurethane polymer P1 include, for example, polymers which can be obtained by reacting at least one polyol with at least one polyisocyanate, in particular a diisocyanate. This reaction can be run by causing the polyol and the polyisocyanate to react by customary methods, for example at temperatures of 50° C. to 100° C., optionally applying suitable catalysts, wherein the polyisocyanate is metered in such that its isocyanate groups are present in a stoichiometric surplus in relation to the hydroxyl groups of the polyol.

In particular, the surplus of polyisocyanate is selected such that, in the resulting polyurethane polymer, once all the hydroxyl groups of the polyol have reacted, a concentration of free isocyanate groups of 0.1 to 5 wt %, preferably of 0.1 to 2.5 wt %, particularly preferably 0.2 to 1 wt %, referred to the polymer as a whole, remains.

Optionally, the polyurethane polymer can be produced using plasticisers, wherein the plasticisers that are used do not contain any groups that are reactive to isocyanates.

Preferred are polyurethane polymers having the stated concentration of free isocyanate groups, which are obtained from the reaction of diisocyanates with high-molecular diols in an NCO:OH ratio of 1.5:1 to 2:1.

Suitable polyols for producing the polyurethane polymer are, in particular, polyether polyols, polyester polyols and polycarbonate polyols, and mixtures of said polyols.

Particularly suitable polyether polyols, also called polyoxyalkylene polyols or oligoetherols, are those which are polymerization products of ethylene oxide, 1,2-propylene oxide, 1,2- or 2,3-butylene oxide, oxetane, tetrahydrofuran or mixtures thereof, optionally polymerized with the help of a starter molecule having two or more active hydrogen atoms such as water, ammonia or compounds thereof that have multiple OH or NH groups, such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane dimethanol, bisphenol A, hydrogenated bisphenol A, 1,1,1-trimethylolethane, 1,1,1-trimethylolpropane, glycerol, aniline, and mixtures of the aforementioned compounds. Both polyoxyalkylene polyols that have a low degree of unsaturation (measured according to ASTM D-2849-69 and indicated as milliequivalents of unsaturation per gram polyol (mEq/g)), produced, for example, with the help of so-called double metal cyanide complex catalysts (DMC catalysts), and polyoxyalkylene polyols having a higher degree of unsaturation, produced, for example, with the help of anionic catalysts such as NaOH, KOH, CsOH or alkali alcoholates can be used.

Particularly suitable are polyoxyethylene polyols and polyoxypropylene polyols, in particular polyoxyethylene diols, polyoxypropylene diols, polyoxyethylene triols and polyoxypropylene triols.

Particularly suitable are polyoxyalkylene diols or polyoxyalkylene triols having a degree of unsaturation of less than 0.02 mEq/g and having a molecular weight ranging from 1,000 to 30,000 g/mol, and polyoxyethylene diols, polyoxyethylene triols, polyoxypropylene diols and polyoxypropylene triols having a molecular weight of 400 to 20,000 g/mol.

Likewise particularly suitable are so-called ethylene oxide terminated ("EO-endcapped", ethylene oxide-endcapped) polyoxypropylene polyols. The latter are special polyoxypropylene polyoxyethylene polyols, obtained, for example, by further alkoxylating pure polyoxypropylene polyols, in particular polyoxypropylene diols and polyoxypropylene triols, with ethylene oxide upon completion of the polypropoxylation reaction, and therefore contain primary hydroxyl groups. Preferred in this case are polyoxypropylene polyoxyethylene diols and polyoxypropylene polyoxyethylene triols.

Further suitable are hydroxyl group-terminated polybutadiene polyols, for example those that are produced by the polymerization of 1,3-butadiene and allyl alcohol or by the oxidation of polybutadiene, and the hydrogenation products thereof.

Further suitable are styrene acrylonitrile-grafted polyether polyols, such as those that are commercially available, for example, under the tradename Lupranol® from BASF Polyurethanes GmbH, Germany.

Suitable polyester polyols are, in particular, polyesters which have at least two hydroxyl groups and are produced according to known methods, in particular by the polycondensation of hydroxycarboxylic acids or the polycondensation of aliphatic and/or aromatic polycarboxylic acids with divalent or polyvalent alcohols.

Particularly suitable are polyester polyols which are produced from divalent to trivalent alcohols, for example, 1,2-ethanedial, diethylene glycol, 1,2-propanediol, dipropylene glycol, 1,4-butanediol, 1,5-pentanedial, 1,6-hexanediol, neopentyl glycol, glycerol, 1,1,1-trimethylolpropane or mixtures of the aforementioned alcohols with organic dicarboxylic acids or the anhydrides or esters thereof, for example succinic acid, glutaric acid, adipic acid, trimethyladipic acid, suberic acid, azelaic acid, sebacic acid, dodecane dicarboxylic acid, maleic acid, fumaric acid, dimeric fatty acid, phthalic acid, phthalic acid anhydride, isophthalic acid, terephthalic acid, dimethyl terephthalate, hexahydrophthalic acid, trimellitic acid and trimellitic acid anhydride or mixtures of the aforementioned acids, and polyester polyols from lactones, for example ε-caprolactone.

Particularly suitable are polyester diols, particularly those that are produced from adipic acid, azelaic acid, sebacic acid, dodecane dicarboxylic acid, dimeric fatty acid, phthalic acid, isophthalic acid and terephthalic acid as dicarboxylic acid, or from lactones, for example ε-caprolactone, and from ethylene glycol, diethylene glycol, neopentyl glycol, 1,4-butanediol, 1,6-hexanediol, dimeric fatty acid diol and 1,4-cyclohexane dimethanol as the divalent alcohol.

Suitable polycarbonate polyols are particularly those that can be obtained by reacting, for example, the above-stated alcohols, used for preparing the polyester polyols, with dialkyl carbonates such as dimethyl carbonate, diaryl carbonates such as diphenyl carbonate or phosgene. Particularly suitable are polycarbonate diols, in particular amorphous polycarbonate diols.

Additional suitable polyols are poly(meth)acrylate polyols.

Likewise suitable are polyhydrocarbon polyols, also called oligohydro carbonols, for example polyhydroxyfunctional ethylene-propylene, ethylene-butylene- or ethylene-propylene-diene copolymers, such as those produced by Kraton Polymers, USA, or polyhydroxyfunctional copolymers from dienes such as 1,3-butadiene or diene mixtures and vinyl monomers such as styrene, acrylonitrile or isobutylene, or polyhydroxyfunctional polybutadiene polyols, such as those produced by the copolymerization of 1,3-butadiene and allyl alcohol, and can also be hydrogenated.

Further suitable are polyhydroxyfunctional acrylonitrile/butadiene copolymers, such as can be produced, for example, from epoxides or amino alcohols and carboxyl-terminated acrylonitrile/butadiene copolymers, which are commercially available under the name Hypro® (previously Hycar®) CTBN from Emerald Performance Materials, LLC, USA.

These stated polyols preferably have an average molecular weight of 250 to 30,000 g/mol, in particular of 1,000 to 30,000 g/mol, and an average OH functionality ranging from 1.6 to 3.

Particularly suitable polyols are polyester polyols and polyether polyols, in particular polyoxyethylene polyol, polyoxypropylene polyol and polyoxypropylene polyoxyethylene polyol, preferably polyoxyethylene diol, polyoxypropylene diol, polyoxyethylene triol, polyoxypropylene triol, polyoxypropylene polyoxyethylene diol and polyoxypropylene polyoxyethylene triol.

In addition to these stated polyols, small quantities of low-molecular divalent or polyvalent alcohols, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane dimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars such as saccharose, other higher-valency alcohols, low-molecular alkoxylation products of the aforementioned divalent and polyvalent alcohols, and mixtures of the aforementioned alcohols can also be used in the production of the polyurethane polymer having terminal isocyanate groups.

Commercially available aliphatic, cycloaliphatic or aromatic polyisocyanates, in particular diisocyanates, can be used as polyisocyanates in the production of the polyurethane polymer.

Examples include diisocyanates, the isocyanate groups of which are each bonded to an aliphatic, cycloaliphatic or arylaliphatic C atom, also called "aliphatic diisocyanates", such as 1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane-1,3-diisocyanate, cyclohexane-1,4-diisocyanate, 1-isocyanato-3,3,5-trimethyl-5-isocyanatomethyl-cyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3-xylylene diisocyanate, m- and p-tetramethyl-1,4-xylylene diisocyanate, bis-(1-isocyanato-1-methylethyl)-naphthalene; and diisocyanates having isocyanate groups, each bonded to an aromatic C atom, also called "aromatic diisocyanates", such as 2,4- and 2,6-toluylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODD; oligomers and polymers of the aforementioned isocyanates, and any mixtures of the aforementioned isocyanates.

Suitable methoxysilane-functional polymers P1 are commercially available, for example, under the tradename Polymer ST50 from Hanse Chemie AG, Germany, and under the tradename Desmoseal® from Bayer MaterialScience AG, Germany.

Ethoxysilane-functional polymers P1 are preferably used.

In a second embodiment, the silane-functional polymer P is a silane-functional polyurethane polymer P2, which can be obtained by reacting an isocyanatosilane IS with a polymer, which has functional terminal groups that are reactive to isocyanate groups, in particular hydroxyl groups, mercapto groups and/or amino groups. This reaction is carried out in a 1:1 stoichiometric ratio of isocyanate groups to functional terminal groups that are reactive to isocyanate groups, or with a slight surplus of functional terminal groups that are reactive to isocyanate groups, for example at temperatures of 20° C. to 100° C., optionally with the use of catalysts.

Suitable isocyanatosilanes IS are compounds of formula (Ib).

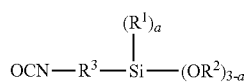

(Ib)

in which $R^1$, $R^2$, $R^3$ and a are as described above.

Examples of suitable isocyanatosilanes IS of formula (Ib) include 3-isocyanatopropyltrimethoxysilane, 3-isocyanatopropyldiethoxymethylsilane and the analogues thereof with methoxy groups or isopropoxy groups in place of the ethoxy groups on the silicon.

Preferably, the polymer has hydroxyl groups as functional terminal groups that are reactive to isocyanate groups.

Suitable polymers having hydroxyl groups include the abovementioned high-molecular polyoxyalkylene polyols, preferably polyoxypropylene diols having an unsaturation degree of less than 0.02 mEq/g and having a molecular weight ranging from 4,000 to 30,000 g/mol, in particular those having a molecular weight ranging from 8,000 to 30,000 g/mol.

However, polyurethane polymers having hydroxyl groups, particularly hydroxyl group-terminated polyurethane polymers, are also suitable for reacting with isocyanatosilanes IS of formula (Ib). Such polyurethane polymers can be obtained by reacting at least one polyisocyanate with at least one polyol. This reaction can be run by causing the polyol and the polyisocyanate to react by customary methods, for example at temperatures of 50° C. to 100° C., optionally with the use of suitable catalysts, wherein the polyol is metered in such that the hydroxyl groups thereof are present in a stoichiometric surplus in relation to the isocyanate groups of the polyisocyanate. A ratio of hydroxyl groups to isocyanate groups of 1.3:1 to 4:1, in particular of 1.8:1 to 3:1, is preferred. Optionally, the polyurethane polymer can be produced using plasticisers, wherein the plasticisers that are used do not contain any groups that are reactive to isocyanates. Suitable for this reaction are the same polyols and polyisocyanates that have already been mentioned as suitable for producing a polyurethane polymer having isocyanate groups, which is used for producing a silane-functional polyurethane polymer P1.

Suitable methoxysilane-functional polymers P2 are commercially available, for example, under the tradenames SPUR+® 1010LM, 1015LM and 1050MM from Momentive Performance Materials Inc., USA and under the tradenames Geniosil® STP-E15, STP-10 and STP-E35 from Wacker Chemie AG, Germany. Ethoxysilane-functional polymers P2 are preferably used.

In a third embodiment, the silane-functional polymer P is a silane-functional polymer P3, which can be obtained by a hydrosilylation reaction of polymers, having terminal double bonds, for example poly(meth)acrylate polymers or polyether polymers, in particular allyl-terminated polyoxyalkylene polymers, described, for example, in U.S. Pat. No. 3,971,751 and U.S. Pat. No. 6,207,766, the disclosure of which is herewith incorporated.

Suitable methoxysilane-functional polymers P3 are commercially available, for example, under the tradenames MS-Polymer® S203(H), S303(H), S227, S810, MA903 and S943, Silyl® SAX220, SAX350, SAX400 and SAX725, Silyl® SAT350 and SAT400, and XMAP® SA100S and SA310S from Kaneka Corp., Japan and under the tradenames Excestar® S2410, S2420, S3430, S3630, W2450 and MSX931 from Asahi Glass Co, Ltd., Japan.

Ethoxysilane-functional polymers P3 are preferably used.

It is also further possible to use other commercially available silane-functional polymers as silane-functional polymer P, for example those that are available under the tradename Tegopac® from Evonik Industries, in particular Tegopac® Seal 100, Tegopac® Bond 150, and Tegopac® Bond 250.

Usually, the silane-functional polymer P is present in a quantity of 10 to 80 wt %, preferably in a quantity of 15 to 60 wt %, referred to the composition as a whole.

Furthermore, the composition according to the invention comprises at least one catalyst for the crosslinking of silane-functional polymers selected from the group consisting of organotitanate, organozirconate and organoaluminate. These catalysts have, in particular, alkoxy groups, sulfonate groups, carboxyl groups, dialkyl phosphate groups, dialkyl pyrophosphate groups and dialkyl diketonate groups.

Particularly suitable organotitanates are the following:
titanium(IV) complex compounds having two 1,3-diketonate ligands, in particular 2,4-pentane dionate (=acetyl acetonate) and two alcoholate ligands;
titanium(IV) complex compounds having two 1,3-ketoesterate ligands, in particular ethylaceto acetate, and two alcoholate ligands;
titanium(IV) complex compounds having one or more amino alcoholate ligands, in particular triethanolamine or 2-((2-aminoethyl)amino)ethanol and one or more alcoholate ligands;
titanium(IV) complex compounds having four alcoholate ligands;
and higher condensed organotitanates, in particular oligomeric titanium(IV)-tetrabutanolate, also referred to as polybutyl titanate.

Particularly suitable alcoholate ligands are isobutoxy, n-butoxy, isopropoxy, ethoxy and 2-ethylhexoxy.

Very particularly suitable are bis(ethylacetoacetato)-diisobutoxy-titanium(IV), bis(ethylacetoacetato)-diisopropoxy-titanium(IV), bis(acetylacetonato)-diisopropoxy-titanium(IV), bis(acetylacetonato)-diisobutoxy-titanium(IV), tris(oxyethyl)amine-isopropoxy-titanium(IV), bis[tris(oxyethyl)amine]-diisopropoxy-titanium(IV), bis(2-ethylhexane-1,3-dioxy)-titanium(IV), tris[2-((2-aminoethyl)amino)ethoxy]-ethoxy-titanium(IV), bis(neopentyl(diallyl)oxy-diethoxy-titanium(IV), titanium(IV)-tetrabutanolate, tetra-(2-ethylhexyloxy)titanate, tetra-(isopropoxy)titanate and polybutyltitanate. Particularly suitable are the commercially available types Tyzor® AA, GBA, GBO, AA-75, AA-65, AA-105, DC, BEAT, BTP, TE, TnBT, KTM, TOT, TPT or IBAY (all from Du Pont/Dorf Ketal); Tytan PBT, TET, X85, TAA, ET, S2, S4 or S6 (all from TensoChema) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Particularly suitable organozirconates are the commercially available types Ken-React® NZ® 38J, KZ® TPPJ, KZ® TPP, NZ® 01, 09, 12 38, 44 or 97 (all from Kenrich Petrochemicals) and Snapcure® 3020, 3030, 1020 (all from Johnson Matthey & Brandenberger).

A particularly suitable organoaluminate is the commercially available type K-Kat 5218 (from King Industries).

Most preferably, the composition according to the invention is essentially free of tin or organic tin compounds, because these are not suitable, for ecological and toxicological reasons, for every application, and furthermore, because they impair the effect of the present invention, in particular the adhesion to plastics, such as PVC.

In particular, the composition comprises ≤0.1 wt %, in particular ≤0.06 wt %, preferably ≤0.01 wt % tin or organic tin compounds. Most preferably, the composition does not contain any tin or any organic tin compounds, such as are typically used for curing compositions based on silane-terminated polymers.

The fraction of catalyst is preferably 0.1 to 10 wt %, in particular 0.2 to 4 wt %, preferably 0.3 to 3 wt %, most preferably 0.5 to 1.5 wt %, of the composition as a whole.

Furthermore, the composition according to the invention comprises at least one base.

Suitable bases are particularly nitrogen-containing compounds. In particular, the base is selected from guanidine, imidazole, imidazoline, bicyclic amidine or derivatives of these compounds.

Preferred are amines such as N-ethyl-diisopropylamine, N,N,N',N'-tetramethyl-alkylene diamines, polyoxyalkylene amines, 1,4-diazabicyclo[2.2.2]octane; aminosilanes, in particular 3-aminopropyl-trimethoxysilane, 3-aminopropyl-dimethoxymethylsilane, N-(2-aminoethyl)-3-aminopropyl-trimethoxysilane, N-(2-aminoethyl)-3-aminopropyl-methyldimethoxysilane, N-(2-aminoethyl)-N'-[3-(trimethoxysilyl)propyl]ethylene diamine and the analogues thereof with ethoxy groups or isopropoxy groups in place of the methoxy groups on the silicon; amidines, in particular 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines, in particular tetramethyl guanidine, 2-guanidino benzimidazole, acetylacetone guanidine, 1,3-di-o-tolyl guanidine, 2-tert.butyl-1,1,3,3-tetramethyl guanidine; and imidazoles, in particular N-(3-trimethoxysilylpropyl)-4,5-dihydroimidazole and N-(3-triethoxysilylpropyl)-4,5-dihydroimidazole.

The fraction of the base is preferably 0.05 to 3 wt %, in particular 0.1 to 2 wt %, preferably 0.2 to 1 wt %, of the composition as a whole.

Furthermore, the composition according to the invention comprises at least one ethoxy mercaptosilane. In particular, the ethoxy mercaptosilane is one of formula (III).

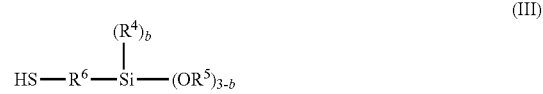

$$(III)$$

In this formula, residue $R^4$ denotes an alkyl group having 1 to 8 C atoms, in particular a methyl group.

Residue $R^5$ denotes an ethyl group.

Residue $R^6$ denotes a linear or branched, optionally cyclic alkylene group having 1 to 20 C atoms, optionally having aromatic fractions, and optionally having one or more heteroatoms, in particular nitrogen atoms.

b denotes a value of 0, 1 or 2.

In particular, the ethoxy mercaptosilane is 3-mercaptopropyl trimethoxysilane or 3-mercaptopropyl diethoxymethylsilane.

In the composition according to the invention, the ethoxy mercaptosilane can also be present in a form in which the mercapto group is blocked, for example as a thiocarboxylate-functional silane. In this case, the mercapto group is released under curing reaction conditions, typically under the influence of water.

The fraction of organosilane is preferably 0.1 to 7 wt %, in particular 0.2 to 4 wt %, preferably 0.3 to 1.5 wt %, of the composition as a whole.

Preferably, the composition further has a filler material. The filler material influences both the rheologic properties of the uncured composition and the mechanical properties and surface conditions of the cured composition. Suitable filler materials are inorganic and organic filler materials, for example natural, ground or precipitated calcium carbonates, optionally coated with fatty acids, in particular stearic acid; barium sulfate ($BaSO_4$, also called barite or heavy spar), calcined kaolins, aluminum oxides, aluminum hydroxides, silicic acids, in particular highly disperse silicic acids from pyrolytic processes, carbon blacks, in particular industrially produced black (carbon black), PVC powder or hollow spheres. Preferred filler materials are calcium carbonates, calcined kaolins, carbon black, highly disperse silicic acids, and flame-retardant filler materials, such as hydroxides or hydrates, in particular hydroxides or hydrates of aluminum, preferably aluminum hydroxide.

It is entirely possible and can even be advantageous to use a mixture of various different filler materials.

A suitable quantity of filler material is within a range, for example, of 10 to 70 wt %, in particular 15 to 60 wt %, preferably 30 to 60 wt %, in relation to the composition as a whole.

Furthermore, the composition according to the invention can also contain additional constituents. Constituents of this type include, for example, plasticisers such as esters of organic carboxylic acids or the anhydrides thereof, such as phthalates, for example, dioctyl phthalate, diisononyl phthalate or diisodecyl phthalate; adipates, for example dioctyl adipate; azelates and sebacates; polyols, for example polyoxyalkylene polyols or polyester polyols; organic phosphoric- and sulfonic acid esters or polybutenes; solvents; fibers, for example polyethylene fibers; dyes; pigments; rheology modifiers such as thickening agents or thixotroping agents, for example urea compounds of the type described as thixotroping agents ("thixotropy endowing agent") in WO 02/48228 A2 on pages 9 to 11; polyamide waxes, bentonites or pyrogenic silicic acids; adhesion promoters, for example epoxysilanes, (meth)acrylic silanes, anhydridosilanes or adducts of the aforementioned silanes with primary aminosilanes, and aminosilanes or urea silanes; crosslinking agents, for example silane-functional oligomers and polymers; drying agents, for example vinyl triethoxysilane, α-functional silanes such as N-(silylmethyl)-O-methyl-carbamates, in particular N-(methyldiethoxysilylmethyl)-O-methyl-carbamate, (methacryloxymethyl)silanes, ethoxymethylsilanes, N-phenyl-, N-cyclohexyl- and N-alkylsilanes, orthoformic acid ester, calcium oxide or molecular sieves; stabilizers, for example against heat, light and UV radiation; flame-retardant substances; surface-active substances such as crosslinking agents, flow-control agents, aerating agents or defoaming agents; biocides such as algicides, fungicides or substances that inhibit fungal growth; and other substances customarily used in moisture-curing compositions.

In particular, the composition according to the invention contains no phthalate plasticisers. Preferred plasticisers are hydrogenated phthalates, for example.

Furthermore, so-called reactive diluents can optionally be used, which are incorporated into the polymer matrix during curing of the composition, in particular by reacting with the silane groups.

In particular, the composition according to the invention does not comprise any constituents that release methanol during curing. Constituents of this type include, in addition to the silane-functional polymer P, reactive constituents that are optionally present, for example adhesion promoters, drying agents, reactive diluents, crosslinking agents and other constituents described above. Constituents that release methanol during curing are typically silane-functional compounds that have methoxy groups. Thus the composition according to the invention particularly does not comprise silane-functional compounds that have methoxysilane groups. Preferably, all the silane-functional compounds present in the composition have terminal groups of formula (I), in which residues $R^1$, $R^2$ and $R^3$, and index a have already been described above.

Most preferably, all hydrolyzable silane groups that are contained in the composition are ethoxysilane groups, in particular triethoxysilane groups. In a most preferred embodiment, the silane-functional polymer P is a silane-functional polymer P1 and has only triethoxysilane groups as silane groups. Furthermore, additives that contain optionally present silane groups have only triethoxysilane groups or alkyldiethoxysilane groups, in particular methyldiethoxysilane or ethyldiethoxysilane groups, preferably triethoxysilane groups, as silane groups.

It is advantageous to select all the stated constituents that are optionally present in the composition, in particular filler material and catalyst, such that the storage stability of the composition is not negatively influenced by the presence of such constituents, in other words, such that the properties of the composition, in particular the application and curing properties, do not change, or change only little during storage. As a result, reactions that result in the chemical curing of the described composition, particularly of the silane groups, do not occur to a significant extent during storage. It is therefore particularly advantageous for the stated constituents to contain no water or at most traces of water, or to release no water or at most traces of water during storage. It can therefore make sense to chemically or physically dry certain constituents before mixing them into the composition.

The composition described above is preferably produced and stored free of moisture. Typically, the composition is stable in storage, in other words, it can be stored free of moisture in suitable packaging or arrangements, for example in a drum, a bag or a cartridge, for a period of several months up to one year or longer, without its application properties or its properties after curing changing to a degree that is relevant to its use. The stability in storage is customarily determined by measuring the viscosity or discharge force.

The present invention further relates to the use of a composition, as described above, as an adhesive, sealant or coating, wherein the composition can be applied without a primer. In particular, the present invention relates to the use of the composition for the adhesion, sealing or coating of plastics, preferably PVC.

Moreover, the composition according to the invention is also suitable for the adhesion, sealing or coating of concrete, mortar, bakestone, brick, gypsum, natural stone such as granite or marble, glass, glass ceramic, metal or metal alloys, wood, plastic and lacquer.

The composition according to the invention is particularly suitable for applications in the naval industry, in particular as an adhesive and a sealant in boatbuilding and shipbuilding.

The invention further relates to a cured composition, which can be obtained from a composition as described above once it has been cured with water, in particular in the form of atmospheric humidity.

Articles that are bonded, sealed or coated with a composition according to the invention include particularly a building structure, in particular an above-ground building structure or underground building structure, an industrially manufactured product or a consumer product, in particular a window, a household appliance, or a means of transport or an attachment for a means of transport. In particular, said articles include boats or ships or parts thereof.

The present invention further relates to the use of an ethoxy mercaptosilane, as described above, as an adhesion promoter in compositions that are based on silane-functional polymers to improve the primerless adhesion of said compositions to plastics, in particular to PVC.

In particular, the ethoxy mercaptosilane according to the invention is used in combination with a catalyst for crosslinking silane-functional polymers, selected from the group consisting of organotitanate, organozirconate and organoaluminate. Preferably, said ethoxy mercaptosilane is used in combination with a base, as described above.

EXAMPLES

The following is a description of embodiment examples, which are intended to specify the described invention in greater detail. Of course, the invention is not limited to these described embodiment examples.

Testing Method

The elasticity modulus (E-modulus) in the elongation range according to Table 1 was determined according to DIN EN 53504 (traction rate: 200 mm/min) on films having a film thickness of 2 mm that were cured for 7 days at 23° C. and 50% relative atmospheric humidity.

The Shore-A hardness was determined according to DIN 53505 on samples having a film thickness of 6 mm that were cured for 7 days at 23° C. and 50% relative atmospheric humidity.

To determine the discharge force, the compositions were filled into lined aluminum cartridges and stored for the times and at the temperatures indicated in Table 1. After a conditioning period of 12 hours at 23° C., the cartridges were opened and the contents discharged by means of a compression device. For this purpose, a nozzle having an inner diameter of 3 mm was screwed onto the cartridge. Using a compression device (Zwick/Roell Z005), the force required to discharge the composition at a discharge rate of 60 mm/min was determined. The indicated value is a mean value of the forces that were measured after a discharge distance of 22 mm, 24 mm, 26 mm and 28 mm. After a discharge distance of 30 mm, measurement was stopped.

Durability was determined by applying a cylindrical adhesive body having a diameter of approximately 2 cm and a length of approximately 4 cm from a cartridge at 23° C. and 50% relative atmospheric humidity to a vertical cardboard surface. Settlement of the free end of the adhesive body of less than approximately 1 cm per day are classified as good, and greater settlements as poor.

To determine the adhesion, adhesive beads of the prepared compositions were applied to the corresponding substrates, exposed to various storage conditions, and then tested at room temperature (23° C.) and 50% relative atmospheric humidity by means of a "bead test". In this process, a notch is made at one end of the bead, just above the adhesive surface. The notched end of the bead is held with round nose pliers and the backing is pulled away. This is accomplished by carefully rolling the bead onto the nose of the pliers, and by placing a cut perpendicular to the direction in which the bead is being pulled, up to the empty backing. The bead pulling rate should be selected such that a cut must be made approximately every 3 seconds. The test distance must be at least 8 cm. The adhesive that remains on the backing once the bead has been pulled away (cohesion break) is evaluated. The adhesive properties are evaluated by estimating the cohesion fracture of the adhesive surface:

1=>95% cohesion fracture
2=75-95% cohesion fracture
3=25-75% cohesion fracture
4=<25% cohesion fracture
5=0% cohesion fracture (purely adhesive fracture)

Test results having cohesion fracture values of less than 75% are considered unsatisfactory.

The storage conditions were 7 days at 23° and 50% relative atmospheric humidity (for adhesion in Table 1: first number), followed by 7 days in a water bath at 20° C. (second number), followed by 1 day at 80° C. and 50% relative atmospheric humidity (third number), followed by 7 days cataplasm storage at 70° C. and 100% relative atmospheric humidity (fourth number).

Production of the Silane-Functional Polyurethane Polymer with Ethoxy Terminal Groups P-EtO Under a nitrogen atmosphere, 700 g of the polyol Acclaim® 12200 (Bayer MaterialScience AG, Germany; low monol polyoxypropylene diol; OH-number 11.0 mg KOH/g; water concentration approx. 0.02 wt %), 32.1 g isophorone diisocyanate (Vestanat® IPDI, Evonik Degussa GmbH, Germany), 85.4 g 2,2,4-trimethyl-1,3-pentanediol diisobutyrate (Eastman TXIB™; Eastman Chemical Company, USA) and 0.4 g Tyzor® IBAY (DuPont, USA) was heated to 90° C. with constant stirring and was left to stand at this temperature. After one hour of reaction time, a free concentration of isocyanate groups of 0.7 wt % was achieved by titration. 0.14 mol reactive silane (Int-EtO) (corresponds to a stoichiometric reaction of the NCO groups with silane) was then added, and stirring was continued for an additional 2 to 3 hours at 90° C. The reaction was stopped as soon as free isocyanate could no longer be detected by means of IR spectroscopy (2275-2230 cm$^{-1}$). The product was cooled to room temperature (23° C.) and placed in storage free of moisture (theoretical polymer content=90%).

The reactive silane Int-EtO (N-(3-triethoxysilyl-propyl)-amino-succinic acid diethylester) was produced as follows: 100 g 3-aminopropyltriethoxysilane (Dynasylan® AMEO from Evonik Degussa GmbH, Germany) was prepared. With good stirring, 77.8 g maleic acid-diethylester (Fluka Chemie GmbH, Switzerland) was added slowly at room temperature, and the mixture was stirred for 12 hours at 60° C.

Production of the Thixotroping Agent TM 1000 g 1,2-cyclohexane dicarboxylic acid diisononylester (DINCH, Hexamoll® DINCH, BASF SE, Germany) and 160 g 4,4'-diphenylmethane diisocyanate (Desmodur® 44 MC L, Bayer MaterialScience AG, Germany) were placed in a vacuum mixer and heated slightly. 90 g monobutylamine was then added slowly, dropwise, with vigorous stirring. The resulting white paste was stirred further under a vacuum and with cooling. The thixotroping agent TM contains 20 wt % thixotroping agent in 80 wt % DINCH.

Production of the Basic Adhesive Formulation 24 parts by weight silane-functional polymer P-EtO, 7 parts by weight DINCH, 17 parts by weight thixotroping agent TM and 1 part by weight tetraethoxysilane (Dynasylan® A from Evonik Degussa GmbH, Germany) were mixed well in a vacuum mixer for 5 minutes. 49 parts by weight dried, precipitated chalk (Socal® U1S2, Solvay SA, Belgium) was then kneaded in for a period of 15 minutes at 60° C. With heating switched off, 0.5 parts by weight catalyst and 0.5 parts by weight DBU were then processed for 10 minutes under a vacuum to form a homogeneous paste. The respective organosilanes in corresponding quantities according to Table 1 were then added together with the catalyst and the DBU to this basic formulation.

The resulting adhesives were then filled into lined aluminum expanding plunger cartridges.

Organosilanes Used

| | |
|---|---|
| Silquest ® A-1891 | 3-mercaptopropyltriethoxysilane (Momentive) |
| Silquest ® VX-225 | aminofunctional oligosiloxane (Momentive) |
| Geniosil ® GF 94 | N-(2-aminoethyl)-3-aminopropyltriethoxysilane (Wacker) |
| Dynasylan ® MTMO | 3-mercaptopropyltrimethoxysilane (Evonik) |
| Dynasylan ® AMEO | 3-aminopropyltriethoxysilane (Evonik) |

TABLE 1

Adhesive compositions having different organosilanes and results:

| | 1 | 2 | 3 | 4 | 5 | 6 | 7 | 8 | 9 |
|---|---|---|---|---|---|---|---|---|---|
| Basic adhesive formulation (wt %) | 99 | 99.2 | 99.4 | 99 | 99 | 99 | 99 | 99 | 99 |
| Organosilane | 1 wt % A-1891 | 0.8 wt % A-1891 | 0.6 wt % A-1891 | 1 wt % AMEO | 1 wt % GF 94 | 1 wt % VX-225 | 1 wt % MTMO | 1 wt % A-1891 | 1 wt % MTMO |
| Catalyst | Tyzor ® IBAY | Tyzor ® IBAY | Tyzor ® IBAY | Tyzor ® IBAY | Tyzor ® IBAY | Tyzor ® IBAY | Tyzor ® IBAY | DBTDL[a] | Tyzor ® IBAY |
| E-modulus 0-5% [MPa] | 1.4 | 1.5 | 1.4 | 1.2 | 1.2 | 0.5 | 1.0 | 0.9 | 1.1 |
| E-modulus 0-25% [MPa] | 0.8 | 0.8 | 0.8 | 0.8 | 0.9 | 0.4 | 0.8 | 0.7 | 0.7 |
| E-modulus 0-50% [MPa] | 0.6 | 0.6 | 0.6 | 0.7 | 0.8 | 0.4 | 0.7 | 0.6 | 0.6 |
| E-modulus 0-100% [MPa] | 0.5 | 0.5 | 0.5 | 0.7 | 0.7 | 0.3 | 0.5 | 0.5 | 0.4 |
| Durability | good | good | good | poor | poor | poor | poor | poor | poor |
| APK (3 mm) [N] | 1017 | 1240 | 1379 | 673 | 1455 | 1275 | 1275 | 717 | 1106 |
| Shore A | 31 | 30 | 31 | 33 | 34 | 19 | 32 | 28 | 29 |
| Adhesion to PVC | 1 1 1 1 | 1 1 1 1 | 1 1 1 1 | 4 4 4 4 | 4 4 4 4 | 4 4 4 4 | 3 2 1 1 | 4 4 2 1 | 4 4 4 4 |
| Adhesion to AlMg3 | 1 1 1 1 | n.d. | n.d. | n.d. | n.d. | n.d. | n.d. | n.d. | n.d. |
| Adhesion to steel | 1 1 1 1 | n.d. | n.d. | n.d. | n.d. | n.d. | n.d. | n.d. | n.d. |
| Adhesion to glass fiber reinforced plastic (unsaturated polyester) | 1 1 1 1 | n.d. | n.d. | n.d. | n.d. | n.d. | n.d. | n.d. | n.d. |

[a]DBTDL: 10% solution of dibutyltin dilaurate in diisodecyl phthalate;
n.d.: Not determined.

The invention claimed is:

1. A composition comprising:
   at least one silane-functional polymer P;
   at least one catalyst for crosslinking of silane-functional polymers, selected from the group consisting of organotitanate, organozirconate and organoaluminate;
   at least one base; and
   at least one ethoxy mercaptosilane,
   wherein the at least one silane-functional polymer P comprises a polymer selected from the group consisting of:
      a silane-functional polyurethane polymer P1 which is obtained by reacting a silane which has at least one group that is reactive to isocyanate groups with a polyurethane polymer which has isocyanate groups,
      a silane-functional polyurethane polymer P2 which is obtained by reacting an isocyanatosilane with a polymer which has functional terminal groups that are reactive to isocyanate groups, and
      a combination thereof.

2. The composition according to claim 1, wherein the silane-functional polymer P has no methoxysilane groups.

3. The composition according to claim 2, wherein the base is selected from the group consisting of: guanidine, imidazole, imidazoline, bicyclic amidine and derivatives of these compounds.

4. The composition according to claim 3, wherein the ethoxy mercaptosilane is 3-mercaptopropyl triethoxysilane.

5. The composition according to claim 4, wherein a fraction of ethoxy mercaptosilane is 0.4 to 2 wt % of the composition as a whole.

6. The composition according to claim 5, wherein the composition additionally comprises: tetraethoxysilane.

7. The composition according to claim 1, wherein the silane-functional polymer P is an ethoxysilane-functional polymer.

8. The composition according to claim 1, wherein the composition contains no constituents that release methanol during curing with water.

9. The composition according to claim 1, wherein the composition contains no phthalate plasticisers.

10. The composition according to claim 1, wherein the base is selected from the group consisting of: guanidine, imidazole, imidazoline, bicyclic amidine and derivatives of these compounds.

11. The composition according to claim 1, wherein the base is 1,8-diazabicyclo[5.4.0]undec-7-ene.

12. The composition according to claim 1, wherein the ethoxy mercaptosilane is 3-mercaptopropyl triethoxysilane.

13. The composition according to claim 1, wherein a fraction of ethoxy mercaptosilane is 0.1 to 7 wt % of the composition as a whole.

14. The composition according to claim 1, wherein the composition additionally comprises: tetraethoxysilane.

15. The composition according to claim 1, wherein a fraction of ethoxy mercaptosilane is 0.2 to 4 wt % of the composition as a whole.

16. The composition according to claim 1, wherein a fraction of ethoxy mercaptosilane is 0.4 to 2 wt % of the composition as a whole.

17. The composition according to claim 1, wherein the at least one silane-functional polymer P comprises a silane-functional polyurethane polymer P1 which is obtained by reacting a silane which has at least one group that is reactive to isocyanate groups with a polyurethane polymer which has isocyanate groups.

18. The composition according to claim 1, wherein the at least one silane-functional polymer P comprises a silane-functional polyurethane polymer P2 which is obtained by reacting an isocyanatosilane with a polymer which has functional terminal groups that are reactive to isocyanate groups.

19. A method for applying a composition comprising:
   providing a composition comprising at least one silane-functional polymer P; at least one catalyst for crosslinking of silane-functional polymers, selected from the group consisting of organotitanate, organozirconate and organoaluminate; at least one base; and at least one ethoxy mercaptosilane; and
   applying the composition as an adhesive, sealant or coating, wherein the composition is applied without a primer,
   wherein the at least one silane-functional polymer P comprises a polymer selected from the group consisting of:
      a silane-functional polyurethane polymer P1 which is obtained by reacting a silane which has at least one group that is reactive to isocyanate groups with a polyurethane polymer which has isocyanate groups, a silane-functional polyurethane polymer P2 which is obtained by reacting an isocyanatosilane with a polymer which has functional terminal groups that are reactive to isocyanate groups, and
    a combination thereof.

20. The method according to claim 19, comprising:
applying the composition for adhesion, sealing or coating of a plastic, wherein the plastic includes PVC.

21. A method comprising:
adding an ethoxy mercaptosilane
as an adhesion promoter to a composition comprising at least one silane-functional polymer P, for improving primerless adhesion of said composition to a plastic,
wherein the at least one silane-functional polymer P comprises a polymer selected from the group consisting of:
    a silane-functional polyurethane polymer P1 which is obtained by reacting a silane which has at least one group that is reactive to isocyanate groups with a polyurethane polymer which has isocyanate groups,
    a silane-functional polyurethane polymer P2 which is obtained by reacting an isocyanatosilane with a polymer which has functional terminal groups that are reactive to isocyanate groups, and
    a combination thereof.

22. The method according to claim 21, wherein the plastic is PVC.

* * * * *